United States Patent [19]

Baldwin et al.

[11] 4,370,677
[45] Jan. 25, 1983

[54] ROTATING SHUTTER SYSTEM FOR IMPROVING THE RESOLUTION OF A VISUAL DISPLAY SYSTEM

[75] Inventors: Dorothy M. Baldwin, Lake Monroe; Frank J. Oharek, Orlando, both of Fla.; Curt Stahl, Scarsdale, N.Y.

[73] Assignee: The United States of America as represented by the Secretary of the Navy, Washington, D.C.

[21] Appl. No.: 215,213

[22] Filed: Dec. 11, 1980

[51] Int. Cl.³ .................. H04N 5/30; H04N 5/72
[52] U.S. Cl. .................... 358/225; 318/313; 318/329; 358/202
[58] Field of Search ............. 358/225, 228, 223, 113, 358/166, 250, 251, 252, 253, 242, 93, 81, 199, 202, 214, 87, 150; 318/313, 314, 318, 329

[56] References Cited

U.S. PATENT DOCUMENTS 3,986,089 10/1976 Sword et al. ............... 318/313
4,100,571 7/1978 Dykes et al. ............... 358/87
4,161,000 7/1979 Cleveland .................. 358/108

FOREIGN PATENT DOCUMENTS 157431 12/1979 Japan ......................... 358/228

OTHER PUBLICATIONS

Miyahara–Moving Picture Quality in Television–Improvement by Blur Suppression or Field Rate Increase–Trans. of IECE of Japan vol. G60 #5 Abstracts May 1977.

Primary Examiner—Joseph A. Orsino, Jr.
Attorney, Agent, or Firm—Robert F. Beers; Robert W. Adams; David S. Kalmbaugh

[57] ABSTRACT

A rotating shutter system for improving the resolution of a visual scene projected upon a spherical screen by a 360° non-programmed visual display system. A rotating shutter, which has on its upper surface a plurality of opaque radial lines, is positioned within an annular probe of the 360° non-programmed visual display system so as to improve the resolution of the annular probe. A direct current motor drives the rotating shutter at a predetermined rotational speed, and a feedback circuit maintains the rotational speed of the direct current motor at a constant value.

13 Claims, 6 Drawing Figures

ROTATING SHUTTER SYSTEM FOR IMPROVING THE RESOLUTION OF A VISUAL DISPLAY SYSTEM

BACKGROUND OF THE INVENTION

1. Field of the Invention

This invention, in general, relates to closed circuit television type simulation devices. In particular, this invention relates to a rotating shutter system for improving the resolution of an annular probe of a visual display system.

2. Description of the Prior Art

In U.S. Pat. No. 4,100,571 issued to Wiley V. Dykes and Frank J. Oharek, there is disclosed a 360° non-programmed visual display system designed for optically scanning a model-board, and then displaying the modelboard on a spherical screen as a visual scene to be viewed by a trainee pilot.

The 360° non-programmed visual display system contains an annular probe that optically scans the modelboard, and converts the scanned optical images of the modelboard to a plurality of electrical signals proportional thereto. An annular projector then converts the aforementioned electrical signals to optical information to be projected on the spherical screen so as to form thereon a visual scene to be viewed by the trainee pilot.

While, satisfactory for its intended purpose of producing a visual scene to be observed by a trainee pilot, the 360° non-programmed visual display system leaves something to be desired in that the visual scene displayed thereby is somewhat smeared.

SUMMARY OF THE INVENTION

The subject invention overcomes the smearing of the visual scene projected by the 360° non-programmed visual display system in that it comprises a relatively simple rotating shutter system to be utilized within the annular probe of the display system so as to increase the resolution thereof by a factor of two.

Included within the rotating shutter system is a rotating shutter having a plurality of evenly spaced opaque radial lines on one surface thereof, a direct current motor for rotating the shutter at a predetermined speed, and a light emitting diode transmitter for broadcasting through the shutter a light beam such that the light beam will be broken by the opaque radial lines of the rotating shutter at a frequency corresponding to the rotational speed of the shutter. A light emitting diode receiver senses the broken light beam, and supplies to a feedback circuit a shutter error signal which has a frequency proportional to the frequency of the broken light beam. The feedback circuit then synchronizes the frequency of the shutter error signal with the frequency of a reference signal generated thereby so as to provide at the output thereof a motor control signal to drive the direct current motor at a constant speed.

DESCRIPTION OF THE PREFERRED EMBODIMENT

Figure 1:
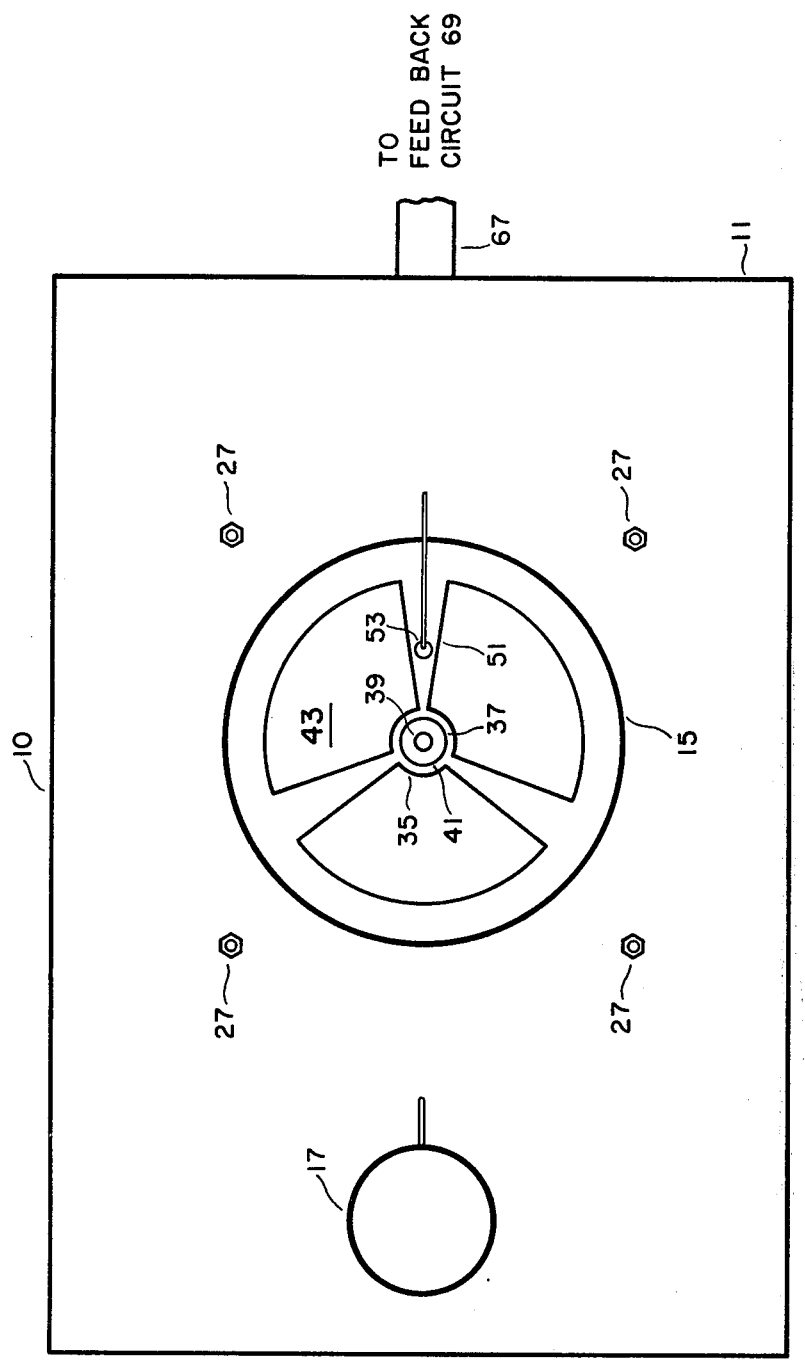
FIG. 1 is a top view of the rotating shutter system constituting the subject invention.

The preferred embodiment of the subject invention will now be discussed in some detail in conjunction with all of the figures of the drawing, wherein like parts are designated by like reference numerals, insofar as it is possible and practical to do so.

Figure 2:
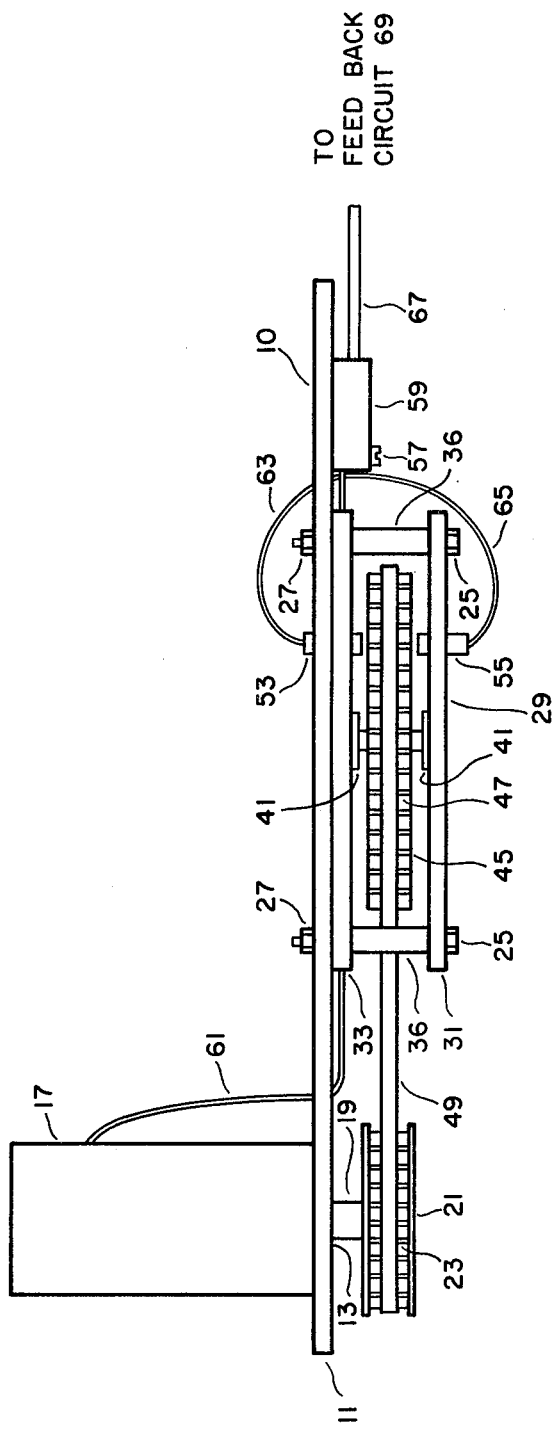
FIG. 2 is a side view of the rotating shutter system of FIG. 1.

Referring now to FIGS. 1 and 2, there is shown a rotating shutter system 10 comprising a motor mounting plate 11 having therein a pair of apertures 13 and 15. Fixedly mounted on the upper surface of motor mounting plate 11 as by a plurality of machine screws, not shown, is a direct current motor 17, the shaft 19 of which passes through aperture 13 of motor mounting plate 11. Effectively connected to shaft 19 of direct current motor 17 is a motor drive pulley 21 which has on the periphery thereof a plurality of gear teeth 23.

Fixedly mounted on the lower surface of motor mounting plate 11 as by a plurality of bolts 25 and nuts 27 is a shutter support assembly 29. Shutter support assembly 29 includes a lower support plate 31, and an upper support plate 33, each of which has in the center thereof a spider 35. Positioned between lower support plate 31 and upper support plate 33 are a plurality of tubular shaped spacer elements 36, each of which has passing therethrough one of the plurality of bolts 25.

Rotatably mounted through a pair of aligned apertures 37, each of which is located in the center of one of the aforementioned spiders 35, is a shaft 39, the ends of which are rotatably supported by a pair of bearing housings 41, each of which is mounted within one of the aforementioned apertures 37.

Mounted on shaft 39 and secured thereto by a pair of removable shutter supports, not shown, is a rotating shutter 43, the details of which will be described more fully below. However, at this time it may be noteworthy to mention that rotating shutter 43 may be fabricated from any highly transparent material such as plastic, and is designed to operate at a rotational speed of six thousand revolutions per minute.

Mounted on the periphery of rotating shutter 43 is a shutter drive pulley 45 which has on the periphery thereof a plurality of gear teeth 47. Shutter drive pulley 45 is effectively connected to motor drive pulley 21 by a timing belt 49. Timing belt 49 has on the inner surface thereof a plurality of gear teeth, not shown, which mesh with the gear teeth of motor drive pulley 21, and shutter drive pulley 45, so as to allow for the rotation of shutter 43 by direct current motor 17.

Mounted through an arm 51 of spider 35 of upper support plate 33 is a light emitting diode transmitter 53. Mounted through an arm, not shown, of spider 35 of lower support plate 31, in alignment with transmitter 53, is a light emitting diode receiver 55.

Mounted on the lower surface of motor mounting plate 11 and secured thereto by a pair of machine screws 57 is a connector 59. Connector 59 has thereon a plurality of connector pins, not shown, one of which is effectively connected to the input of direct current motor 17 by a shielded cable 61, one of which is connected to the input of transmitter 53 by a wire 63, and one of which is connected to the output of receiver 55 by a wire 65. A shielded cable 67 connects a feedback circuit 69, FIG. 3, to connector 59 so as to provide electrical connections between feedback circuit 69, FIG. 3, and the aforementioned transmitter 53, receiver 55, and direct current motor 17.

Figure 3:
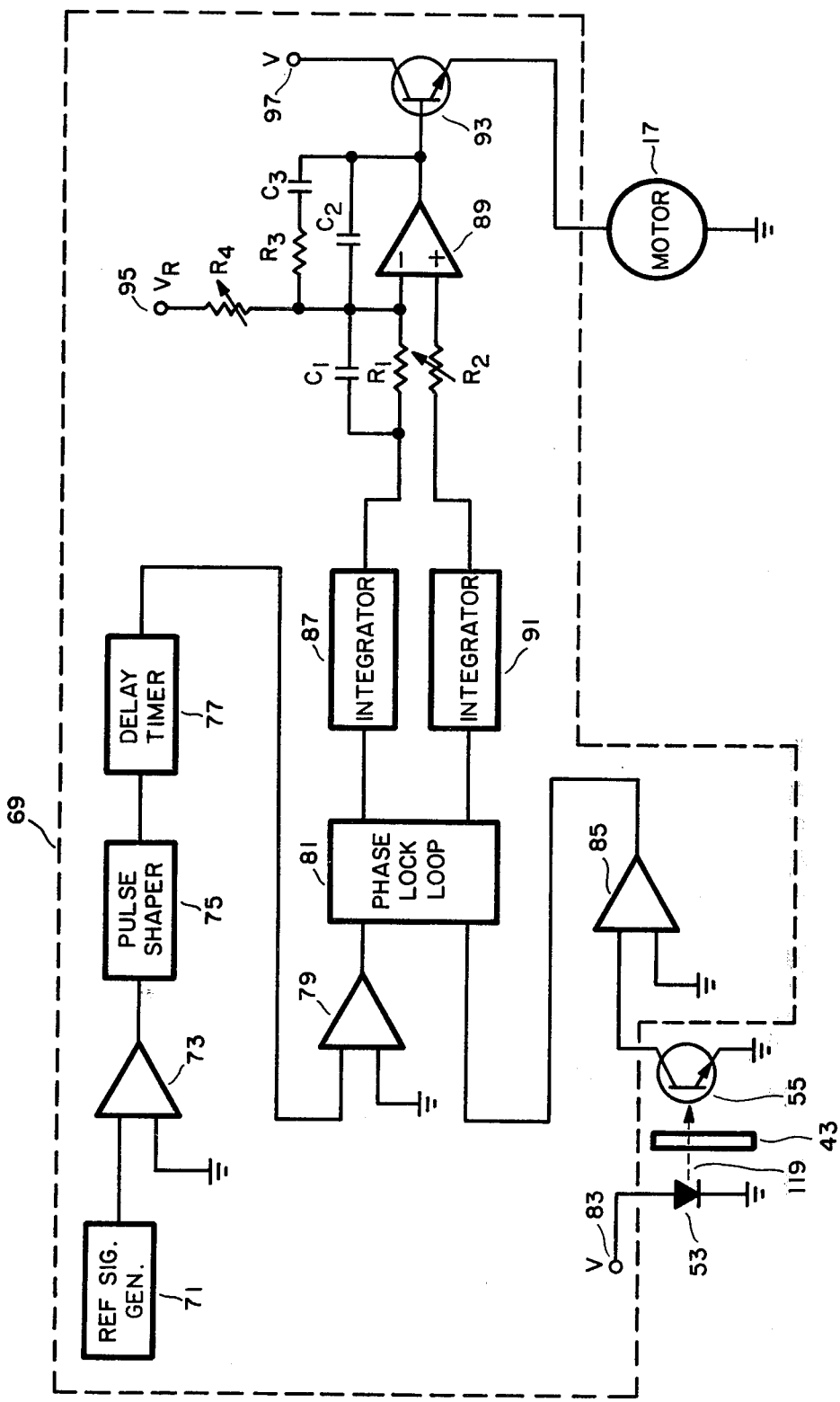
FIG. 3 is an electrical schematic of the feedback circuit of the rotating shutter system of FIG. 1.

Referring now to FIG. 3, there is shown an electrical schematic of feedback circuit 69 which includes a reference signal generator 71. The output of reference signal generator 71 is connected to the input of an amplifier 73, the output of which is connected to the input of a pulse shaper 75, with the output thereof connected to the input of a delay timer 77. The output of delay timer 77 is, in turn, connected to the input of an amplifier 79, with the output thereof connected to the reference input of a phase lock loop circuit 81.

At this time it may be noteworthy to mention that phase lock loop circuit 81 is a servo circuit commercially available from several different sources. In particular, it has been found that a phase lock loop, Model 4046B, manufactured by Fairchild, Inc., of Mountain View, Calif., performs satisfactorily as phase lock loop circuit 81.

The output of a direct current voltage source 83 is connected to the input of light emitting diode transmitter 53. Spatially disposed between light emitting diode 53 and receiver 55, as mentioned above, is rotating shutter 43.

The output of receiver 55 is connected to the input of an amplifier 85, with the output thereof connected to the signal input of phase lock loop 81.

The slow error signal output of phase lock loop 81 is connected to an integrator 87, the output of which is connected through the parallel combination of a resistor $R_1$, and a capacitor $C_1$ to the negative input of a differential amplifier 89. The fast error signal output of phase lock loop 81 is connected to the input of an integrator 91, the output of which is connected through a variable resistor $R_2$ to the positive input of differential amplifier 89, with the output thereof connected to the base of a PNP transistor 93. Connected between the negative input and the output of differential amplifier 89, in parallel, is a capacitor $C_2$ and the series combination of a resistor $R_3$ and a capacitor $C_3$. The output of a direct current voltage source 95 is connected through a variable resistor $R_4$ to the negative terminal of a differential amplifier 89.

The output of a direct current voltage source 97 is connected to the collector of transistor 93, with the emitter thereof connected to the input of direct current motor 17.

Figure 4:
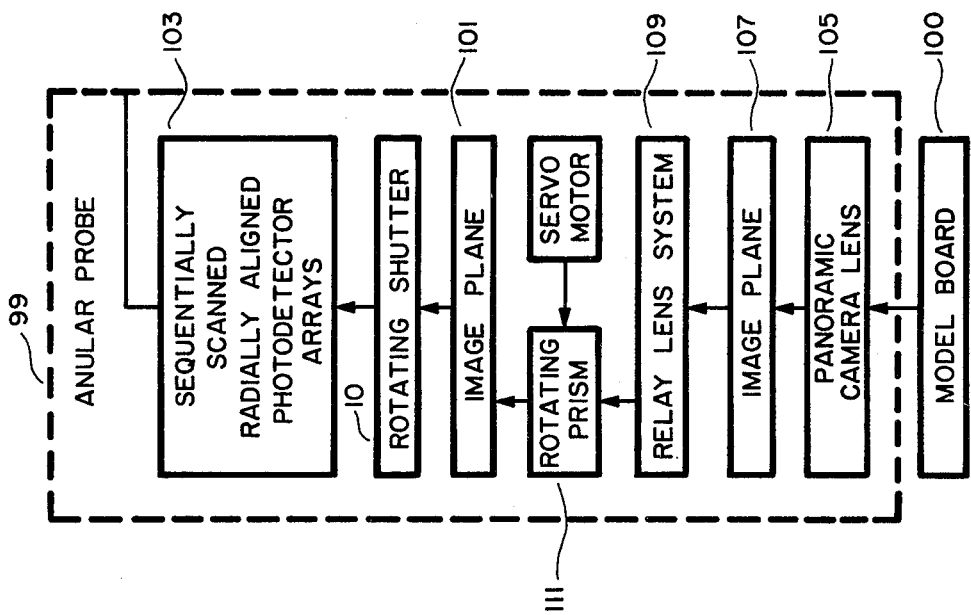
FIG. 4 is a block diagram of the annular probe in which the rotating shutter system of FIG. 1 is incorporated.

Referring now to FIG. 4, there is shown an annular probe 99 which has therein rotating shutter system 10. Annular probe 99 may be an optical probe which observes a modelboard 100 such as that illustrated in U.S. Pat. No. 4,100,571, entitled 360° Non-Programmed Visual System, by Wiley V. Dykes and Frank J. Oharek. In the preferred embodiment of the subject invention, rotating shutter system 10, which is positioned between an image plane 101 and sequentially scanned radially aligned photodetector arrays 103, is utilized to improve the resolution of annular probe 99, and thus improve the resolution of the visual system illustrated in the aforementioned U.S. Pat. No. 4,100,571.

Figure 5:
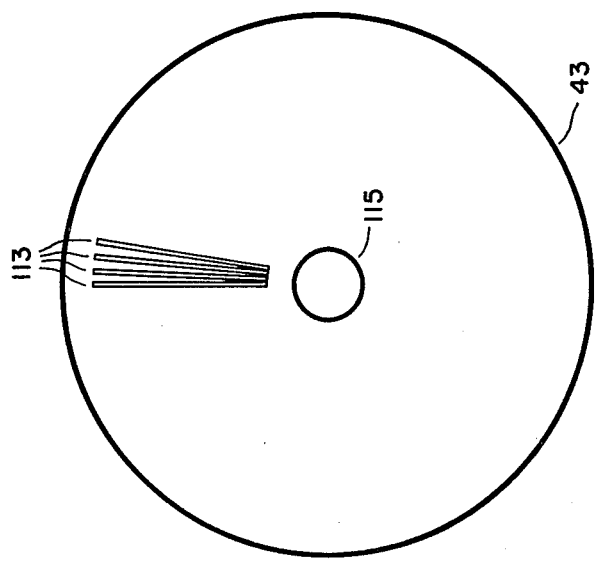
FIG. 5 is a top view of the rotating shutter of the rotating shutter system of FIG. 1.

Referring now to FIGS. 4 and 5, there is shown rotating shutter 43 which is designed to reduce the smearing of image plane 101 by one-half, and thus improve the resolution of annular probe 13 by a factor of two.

The image of modelboard 100 is viewed by a panoramic camera lens 105 of annular probe 99 which forms an image plane 107. The image of image plane 107 is then transmitted through a relay lens system 109 to a rotating prism 111.

Rotating prism 111 rotates the image of image plane 107 at five revolutions per second, thereby forming image plane 101. The image of image plane 101 is then transmitted to a photodetector array 103, which includes twelve linear arrays or sets of sequentially scanned photodiodes. Each linear array of photodetector array 103, in turn, scans the image of image plane 101 for a predetermined time period of fifty-six microseconds.

The smear of the image of image plane 101 may be determined in accordance with the following formula:

$$S = 2.16 \times 10^4 \, \omega t, \tag{1}$$

where S is the smear, $\omega$ is the rotational speed of prism 111, and t is the scan time of one linear array of photodetector array 103. Thus, for the image of image plane 101, the smear was calculated to be six arc minutes in accordance with formula (1) above.

Therefore, to increase the resolution of the image of image plane 101 by a factor of two, the smear thereof must be reduced to three arc minutes.

This, in turn, requires that rotating shutter 43 have thereon a plurality of evenly spaced opaque radial lines 113, the number of radial lines 113 to be calculated in accordance with the following design formula:

$$S = \frac{36 \times 10^4 \, S}{\omega}, \tag{2}$$

where X is the number of radial lines 111 upon rotating shutter 43, S is the smear, and $\omega$ is the rotational speed of shutter 43. The number of radial lines 113 for shutter 43, when rotating at the designed speed of six thousand revolutions per minute, was calculated to be one hundred eighty, only four of which are illustrated in FIG. 5.

At this time it may be noteworthy to mention that each of the aforementioned radial lines 113 may be fabricated from any highly opaque material such as aluminum coating, and secured to shutter 43 by conventional means such a vacuum coating. In addition, it may be noted that rotating shutter 43 has in the center thereof an aperture 115 through which shaft 39, FIG. 1, passes.

Figure 6:
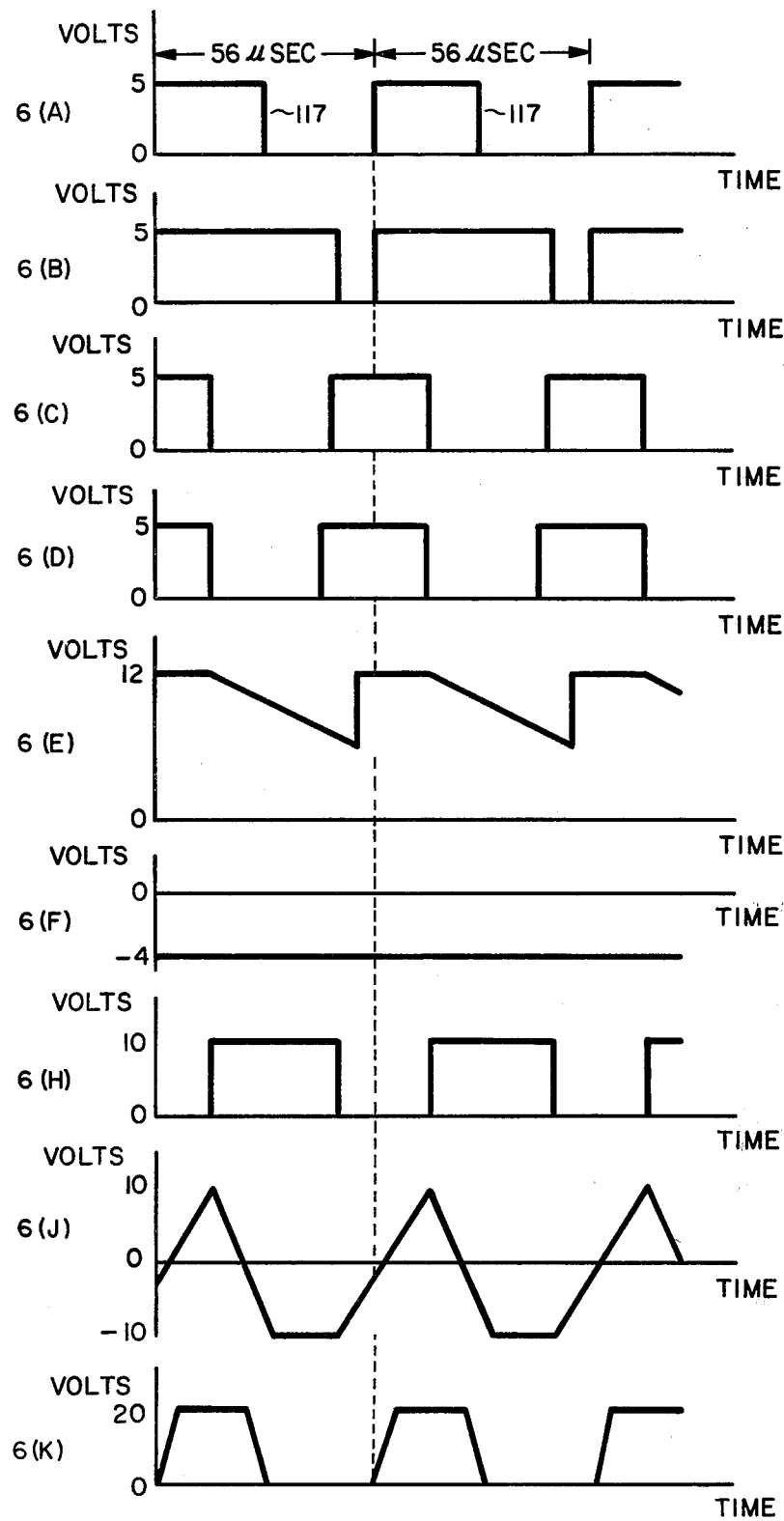
FIG. 6 is a graphical representation of various signals which occur at the outputs of some of the elements of FIG. 3.

Referring now to FIG. 6, there is shown a graphical representation of various pulses which occur at the outputs of some of the elements of the subject invention, as will be discussed more fully below.

The operation of the subject invention will now be discussed briefly in conjunction with all of the figures of the drawings.

Referring first to FIGS. 1, 2, and 4, there is shown panoramic camera lens 105 of annular probe 99 which optically observes modelboard 100. Panoramic camera lens 105 then converts the image of modelboard 100 observed thereby to image plane 107, the image of which is transferred through relay lens system 109 to rotating prism 111. Rotating prism 111 rotates the image of image plane 107 at five revolutions per second so as to form the image of image plane 101. The image of image plane 101 is then scanned in sequence by each of the twelve linear arrays of photodetector 103 for fifty-six microseconds.

As discussed previously, rotating shutter system 10 is designed to increase the resolution of the image of image plane 101 by a factor of two. This, in turn, requires direct current motor 17 to drive shutter 43 at a constant rotational speed of six thousand revolutions per minute. Feedback circuit 69, FIG. 3, is utilized to maintain the rotational speed of direct current motor 17 at a constant value, and thus maintain the rotational speed of shutter 43 at the aforementioned six thousand revolutions per minute, as will be discussed more fully below.

Referring now to FIG. 3, there is shown reference signal generator 71 which produces at the output thereof a reference signal having a series of pulses 117, the frequency of which is eighteen kilohertz, as exemplified in FIG. 6(A). The reference signal of FIG. 6(A) is amplified by amplifier 73, and then supplied to the input of pulse shaper 75, which expands the pulse width of each pulse 117 such that a signal similar to that of FIG. 6(B) appears at the output thereof. The signal of FIG. 6(B) is supplied to the input of delay timer 77 which delays each expanded pulse of the signal of FIG. 6(B) such that a signal similar to that illustrated in FIG. 6(C) appears at the output thereof.

The signal of FIG. 6(C) is amplified by amplifier 79, and then supplied to the reference input of phase lock loop 81.

Simultaneously, with the supplying of the signal of FIG. 6(C) by delay timer 77 to the reference input of phase lock loop 81, there is provided by receiver 55 a shutter error signal similar to that of FIG. 6(D), as will be explained more fully below. The signal of FIG. 6(D) is then amplified by amplifier 85 and supplied to the signal input of phase lock loop 81.

Voltage source 83 supplies a direct current to the input of light emitting diode transmitter 53. Light emitting diode transmitter 53 then broadcasts through shutter 43 to receiver 55 a light beam 119. When shutter 43 is rotating at six thousand revolutions per minute, light beam 119 will be broken by opaque radial lines 113 of shutter 43 eighteen thousand times per second. This, in turn, causes the signal of FIG. 6(D) to appear at the output of receiver 55. It may be noteworthy to mention at this time that the frequency of the signal of FIG. 6(D) corresponds to the frequency at which light beam 119 is broken by shutter 43, which under normal operating conditions is eighteen kilohertz.

Phase lock loop 81 provides at the slow error signal output thereof a slow error signal similar to that of FIG. 6(E), and at the fast error signal output thereof a fast error signal similar to that of FIG. 6(H), each of which is in response to the signals of FIGS. 6(C) and 6(D).

The slow error signal of FIG. 6(E) is then supplied to the input of integrator 87 which integrates the slow error signal of FIG. 6(E) such that a signal similar to that of FIG. 6(F) appears at the output of integrator 87.

The fast error signal of FIG. 6(H) is supplied to the input of integrator 91, which integrates the fast error signal of FIG. 6(H) such that a signal similar to that of FIG. 6(J) appears at the output of integrator 91.

The aforementioned slow and fast error signals are respectively supplied to the negative and positive inputs of differential amplifier 89. Amplifier 89, in turn, provides at the output thereof a motor control signal similar to that illustrated in FIG. 6(K), the output voltage of which is expressed by the relationship:

$$V_{out} = V_F - \frac{S^2 R_1 C_1 (SR_3 C_2 C_3 + C_2 C_3)(V_s - V_F)}{(SR_2 C_3 + 1)(SR_1 C_1 = 1)} \qquad (3)$$

$$- \frac{S(SR_3 C_2 C_3 + C_2 + C_3)(V_R - V_F)}{SR_3 C_3 + 1},$$

where $V_{out}$ is the voltage appearing at the output of differential amplifier 89, $V_F$ is the fast error signal of FIG. 6(F), S is the complex frequency, $V_S$ is the slow error signal of FIG. 6(J), and $V_R$ is the voltage appearing at the output of voltage source 95.

The control signal of FIG. 6(K) is then supplied to transistor 93 which amplifies the aforementioned drive signal so as to drive motor 17 at a constant speed, and thus rotate shutter 43 at the predetermined speed of six thousand revolutions per minute.

At this time it may be noteworthy to mention that phase lock loop 81 operates as an electronics servo loop so as to maintain the rotational speed of shutter 43 at six thousand revolutions per minute. Phase lock loop 81 locks the error signal of FIG. 6(D) with the reference signal of FIG. 6(C) so as to provide the slow error signal of FIG. 6(E) and the fast error signal of FIG. 6(H). Thus, whenever the error signal of FIG. 6(D) is out of phase with the reference signal of FIG. 6(C), indicating that the frequency of the error signal on FIG. 6(D) is deviating from the frequency of the reference signal of FIG. 6(C), the aforementioned slow and fast error signal will change accordingly. This, in turn, will either increase or decrease the speed of motor 17 so as to either increase or decrease the speed of shutter 43 until the frequency of the shutter error signal of FIG. 6(D) is identical to the frequency of the reference signal of FIG. 6(C). Phase lock loop 81 will then lock or synchronize the signal of FIG. 6(D) with the signal of FIG. 6(C) as discussed above, so as to provide the aforementioned slow and fast error signals, and thus maintain the rotational speed of shutter 43.

From the foregoing, it may readily be seen that the subject invention comprises a new, unique, and exceedingly useful rotating shutter system for improving the resolution of an annular probe which constitutes a considerable improvement over the known prior art. Obviously, many modifications and variations of the present invention are possible in light of the above teachings. It is, therefore, to be understood that within the scope of the appended claims, the invention may be practiced otherwise than as specifically described.

What is claimed is:

1. A rotating shutter system for improving the resolution of an annular probe based 360° visual display system, comprising in combination:

a rotating shutter having on one surface thereof a plurality of evenly spaced opaque radial lines;

servo motor means effectively connected to said rotating shutter for rotating said shutter at a predetermined speed;

transmitting means positioned above said rotating shutter, and having an input for broadcasting through said rotating shutter a light beam such that said light beam will be broken by the opaque radial lines of said rotating shutter at a frequency corresponding to the speed of rotation of said rotating shutter;

sensing means positioned below said rotating shutter in alignment with said transmitting means and having an output for receiving said broken light beam, and for providing at the output thereof a shutter error signal in response to the broken light beam received thereby, said shutter error signal having a frequency corresponding to the frequency at which said light beam is broken by said rotating shutter; and feedback circuit means comprising:
  a reference signal generator having an output;
  a pulse shaper having an input effectively connected to the output of said reference signal generator, and an output;
  a delay timer having an input connected to the output of said pulse shaper, and an output;
  a phase lock loop having a reference input effectively connected to the output of said delay timer, a signal input effectively connected to the output of said sensing means, a slow error signal output, and a fast error signal output;
  a first integrator having an input connected to the slow signal error output of said phase lock loop, and an output;
  a second integrator having an input connected to the fast signal error output of said phase lock loop, and an output;
  a differential amplifier having a negative input connected to the output of said first integrator, a positive input connected to the output of said second integrator, and an output;
  a direct current voltage source having an output; and
  a transistor having a collector connected to the output of said direct current voltage source, a base connected to the output of said differential amplifier, and an emitter connected to the input of said servo motor means.

2. The rotating shutter system of claim 1, wherein said plurality of evenly spaced opaque radial lines comprises one hundred eighty evenly spaced opaque radial lines.

3. The rotating shutter system of claim 1, wherein the predetermined speed of rotation of said rotating shutter is six thousand revolutions per minute.

4. The rotating shutter system of claim 1, wherein said transmitting means is a light emitting diode transmitter.

5. The rotating shutter system of claim 1, wherein said sensing means is a light emitting diode receiver.

6. The rotating shutter system of claim 1, further characterized by a direct current voltage connected to the input of said transmitting means.

7. A device for improving the resolution of a visual system comprising, in combination:
  a rotating shutter having on one surface thereof a plurality of evenly spaced opaque radial lines;
  a direct current motor effectively connected to said rotating shutter for the rotation thereof at a predetermined speed, said direct current motor having an input;
  a light emitting diode transmitter positioned above said rotating shutter, said light emitting diode transmitter having an input;
  a first direct current voltage source having an output connected to the input of said light emitting diode transmitter;
  a light emitting diode receiver positioned below said rotating shutter in alignment with said light emitting diode transmitter, said light emitting diode receiver having an output;
  a reference signal generator having an output;
  a pulse shaper having an input effectively connected to the output of said reference signal generator, and an output;
  a delay timer having an input connected to the output of said pulse shaper, and an output;
  a phase lock loop having a reference input effectively connected to the output of said delay timer, a signal input effectively connected to the output of said light emitting diode receiver, a slow error signal output, and a fast error signal output;
  a first integrator having an input connected to the slow error signal output of said phase lock loop and an output;
  a second integrator having an input connected to the fast error signal output of said phase lock loop, and an output;
  a differential amplifier having a negative input connected to the output of said first integrator, a positive input connected to the output of said second integrator, and an output;
  a second direct current voltage source having an output; and
  a transistor having a collector connected to the output of said second direct current voltage source, a base connected to the output of said differential amplifier, and an emitter connected to the input of said direct current motor.

8. The device of claim 7, wherein said rotating shutter is fabricated from a highly transparent plastic.

9. The device of claim 7, whereby said plurality of evenly spaced opaque radial lines comprises one hundred eighty evenly spaced opaque radial lines.

10. The device of claim 7, wherein each of said plurality of evenly spaced opaque radial lines is fabricated from an aluminum coating.

11. The device of claim 7, wherein said predetermined speed of rotation for said rotating shutter is six thousand revolutions per minute.

12. The device of claim 7, wherein said transistor comprises a PNP transistor.

13. The device of claim 7, further characterized by an annular probe, said annular probe having therein a rotating prism, a photodetector array located adjacent said rotating prism, and said rotating shutter positioned between said rotating prism and said photodetector array.

* * * * *